Patented Oct. 19, 1948

2,451,853

UNITED STATES PATENT OFFICE 2,451,853

MANUFACTURE OF PENICILLIN

Thomas Hobson Mead and Maurice Vincent Stack, London, and Ernest Lester Smith, North Harrow, England, assignors to Therapeutic Research Corporation of Great Britain Limited, London, England No Drawing. Application August 4, 1945, Serial No. 609,020. In Great Britain October 31, 1944

3 Claims. (Cl. 195—36)

This invention is concerned with improvements in and relating to the manufacture of penicillin.

It is well known that when certain molds, notably *Penicillium notatum* and *Aspergillus flavus*, are grown in a suitable medium and at appropriate temperatures, therapeutically active material commonly known as penicillin is produced in the metabolism solution.

It is also well known that the growth of *Penicillium notatum* on a medium comprising a solution containg 4% of glucose and also suitable nutrient salts, can under suitably controlled conditions yield a metabolism solution containing up to about 20 Oxford units of penicillin per millilitre. It is further well known to those engaged in the manufacture of penicillin that the growth of *Penicillium notatum* on a medium comprising a solution containing a suitable carbohydrate or carbohydrates such as lactose or a mixture of lactose and glucose together with suitable nutrient salts and also a substantial proportion such as up to about 10% by volume of corn steep liquor can under similarly carefully controlled condition yield metabolism solutions containing considerably larger amounts of penicillin for example up to about 80 Oxford units per millilitre.

We have now found that a substantial proportion of the specific activity of corn steep liquor responsible for promoting the production of penicillin during the growth of *Penicillium notatum* on media containing substantial amounts of corn steep liquor is due to the presence of β-phenylethylamine and/or β-p-hydroxyphenylethylamine in corn steep liquor.

We have further found that β-phenylethylamine and β-p-hydroxyphenylethylamine were present in a particular sample of corn steep liquor to the extent of about 0.02% by weight, an amount which it is possible to calculate would account for the production of yields of at least 75 Oxford units per millilitre of penicillin in a medium containing 10% of such a sample of corn steep liquor.

We have further found that when β-phenylethylamine in an amount sufficient to produce an additional concentration of β-phenylethylamine not exceeding 1% by weight is added to a medium comprising substantial proportions of corn steep liquor, such as up to 10% by volume, together with a suitable source or sources of carbohydrate, suitable salts and if desired hydrolysates of suitable proteins such as casein, the yields of penicillin obtainable during growth on the medium of *Penicillium notatum*, are some 40 Oxford units per millilitre more than is obtained during the growth of the mold under the same conditions on a similar medium differing only in the omission of added β-phenylethylamine. β-p-hydroxyphenylethylamine under similar conditions also has a favourable effect on the yield of penicillin.

According to the invention therefore we provide a process for the manufacture of penicillin in which *Penicillium notaum* or other penicillin-producing mold is grown in a medium containing corn steep liquor to which has been added β-phenylethylamine and/or β-p-hydroxyphenylethylamine and/or one or more salts of these bases.

Where the corn steep liquor already contains β-phenylethylamine and/or β-p-hydroxyphenylethylamine the concentration of one or both of these substances in the medium may according to the invention be increased.

The addition to the medium of β-phenylethylamine and/or β-p-hydroxyphenylethylamine or of one or more suitable salts of these bases may be effected by adding the said compound or compounds to the medium.

The invention may be applied to any of the methods of culture usually employed such as culture in trays, bottles, columns or tanks and whether by surface or submerged culture.

Following is a description by way of example only of one method of carrying the invention into effect.

A basic medium is prepared of the following composition:

| | |
|---|---:|
| Lactose _____grams__ | 30 |
| Corn steep liquor_____millilitres__ | 80 |
| Sodium nitrate _____grams__ | 3.0 |
| Water to_____millilitres__ | 1,000 |

The solution was adjusted to pH 5.4 with caustic soda.

500 ml. quantities of this medium were autoclaved in 7 inch diameter mold culture flasks plugged with cotton wool, inoculated with a strain of *Penicillium notatum* of proved penicillin-producing ability, and incubated at 24° C. After 7 days, this medium yielded an average of 74 Oxford units of penicillin per ml. and after 8 days an average of 83 Oxford units per ml. Further portions of this medium to which 0.006 gram of β-phenylethylamine hydrochloride per 100 ml. had been added before autoclaving, similarly treated, yielded after 7 days an average of 90 Oxford units of penicillin per ml. and after 8 days an average of 101 Oxford units per ml. Further portions of this medium to which 0.1 gram of β-phenylethylamine hydrochloride per 100 ml. had been added, similarly treated, yielded after 7 days an average of 102 Oxford units per ml. and after 8 days an average of 122 Oxford units of penicillin per ml.

It will be understood that the invention is not limited to the above-mentioned example either as regards the composition of the medium or the specific conditions described.

We claim:

1. A process for manufacturing penicillin which comprises growing a penicillin producing mold in a nutrient medium containing corn steep liquor and containing an added amount over that contained in any corn steep liquor present of at least one substance selected from the group consisting of β-phenylethylamine, β-p-hydroxyphenylethylamine and salts of said amines, said substance being added in an amount producing a concentration not exceeding 1% by weight of the medium.

2. A process as defined in claim 1 in which the medium also contains an added amount of protein hydrolysate material.

3. A process as defined in claim 1 in which the medium also contains casein hydrolysate.

THOMAS HOBSON MEAD.
MAURICE VINCENT STACK.
ERNEST LESTER SMITH.

REFERENCES CITED

The following references are of record in the file of this patent:

UNITED STATES PATENTS

| Number | Name | Date |
|---|---|---|
| 2,437,918 | McCormack | Mar. 16, 1948 |

OTHER REFERENCES

Coghill: Monthly Progress Report No. 6, Aug. 10, 1942; distributed by Committee on Medical Research, O. S. S. R. D.—2 pages. Ibid., Report No. 16, Nov. 10, 1943, section (C), page 2. Ibid., Report No. 30, July 5, 1944, part II, pages 8 to 10. Ibid., Report No. 23, Apr. 2, 1945, part III, pages 12, 15 to 19.

Pennsylvania State College, Penicillin Interim Report 145–124, Mar. 30, 1945, page 1.